(12) United States Patent
Im et al.

(10) Patent No.: US 10,317,735 B2
(45) Date of Patent: Jun. 11, 2019

(54) CURVED DISPLAY DEVICE AND METHOD OF MANUFACTURING THE SAME

(71) Applicant: Samsung Display Co., Ltd., Yongin-Si, Gyeonggi-Do (KR)

(72) Inventors: Wan-Soon Im, Cheonan-si (KR); Yongwoo Hyung, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 113 days.

(21) Appl. No.: 15/364,844

(22) Filed: Nov. 30, 2016

(65) Prior Publication Data

US 2017/0082880 A1 Mar. 23, 2017

Related U.S. Application Data

(63) Continuation of application No. 14/320,793, filed on Jul. 1, 2014, now Pat. No. 9,547,199.

(30) Foreign Application Priority Data

Dec. 18, 2013 (KR) .................. 10-2013-0158429

(51) Int. Cl.
*G02F 1/1339* (2006.01)
*G02F 1/1343* (2006.01)
(Continued)

(52) U.S. Cl.
CPC ............ *G02F 1/1339* (2013.01); *G02F 1/137* (2013.01); *G02F 1/13306* (2013.01); *G02F 1/133305* (2013.01); *G02F 1/133512* (2013.01); *G02F 1/133753* (2013.01); *G02F 1/134309* (2013.01); *G02F 1/136286* (2013.01); *G02F 1/1368* (2013.01); *G02F 1/133345* (2013.01);
(Continued)

(58) Field of Classification Search
CPC ..................................... G02F 1/1339
See application file for complete search history.

(56) References Cited

U.S. PATENT DOCUMENTS 5,606,194 A 2/1997 Lebrun et al.
6,115,097 A 9/2000 Yamazaki
(Continued)

FOREIGN PATENT DOCUMENTS

CN 101533173 A 9/2009
CN 102629033 A 8/2012
(Continued)

*Primary Examiner* — Edmond C Lau
(74) *Attorney, Agent, or Firm* — Cantor Colburn LLP

(57) ABSTRACT

A curved display device includes a display substrate which is curved in a first direction in a plan view and includes a display area including a plurality of pixels configured to display an image, and a peripheral area disposed adjacent to the display area, an opposite substrate which faces the display substrate, the opposite substrate coupled to the display substrate and curved in the first direction along the display substrate, a grayscale control layer interposed between the display substrate and the opposite substrate, and a coupling member which is disposed in the peripheral area, interposed between the display substrate and the opposite substrate, and configured to couple the display substrate to the opposite substrate, and includes a first sealing portion which extends in the first direction and includes a light blocking material.

14 Claims, 17 Drawing Sheets

(51) Int. Cl.

| | | |
|---|---|---|
| *G02F 1/1337* | (2006.01) | |
| *G02F 1/1335* | (2006.01) | |
| *G02F 1/1333* | (2006.01) | |
| *G02F 1/133* | (2006.01) | |
| *G02F 1/1362* | (2006.01) | |
| *G02F 1/137* | (2006.01) | |
| G02F 1/1368 | (2006.01) | |

(52) U.S. Cl.
CPC ............ *G02F 2001/133742* (2013.01); *G02F 2001/133757* (2013.01); *G02F 2001/134345* (2013.01); *G02F 2201/121* (2013.01); *G02F 2201/123* (2013.01); *G02F 2201/56* (2013.01)

(56) References Cited

U.S. PATENT DOCUMENTS

| | | | |
|---|---|---|---|
| 6,970,217 | B2 | 11/2005 | Lim et al. |
| 7,050,131 | B2 | 5/2006 | Choi et al. |
| 2010/0200278 | A1 | 8/2010 | Wang et al. |
| 2011/0261295 | A1* | 10/2011 | Kim .................. G02F 1/133707 349/96 |
| 2012/0062447 | A1 | 3/2012 | Tseng et al. |
| 2012/0268708 | A1 | 10/2012 | Chida |
| 2013/0128192 | A1* | 5/2013 | Ishikawa ........... G02F 1/133512 349/96 |
| 2013/0321740 | A1* | 12/2013 | An ....................... H05K 5/0217 349/58 |
| 2014/0092356 | A1 | 4/2014 | Ahn et al. |
| 2014/0354938 | A1 | 12/2014 | Kim |
| 2014/0368782 | A1 | 12/2014 | Kim et al. |
| 2015/0301390 | A1 | 10/2015 | Kim |

FOREIGN PATENT DOCUMENTS

| | | |
|---|---|---|
| JP | H02304527 A | 12/1990 |
| JP | H07013171 A | 1/1995 |
| JP | H10054991 A | 2/1998 |
| JP | 2003295217 A | 10/2003 |
| JP | 2004151625 A | 5/2004 |
| JP | 2010026372 A | 2/2010 |
| KR | 1020030088645 A | 11/2003 |
| KR | 1020060094432 A | 8/2006 |

* cited by examiner

CURVED DISPLAY DEVICE AND METHOD OF MANUFACTURING THE SAME

This application is a continuation of U.S. patent application Ser. No. 14/320,793, filed on Jul. 1, 2014, which claims priority to Korean Patent Application No. 10-2013-0158429, filed on Dec. 18, 2013, and all the benefits accruing therefrom under 35 U.S.C. § 119, the contents of which are hereby incorporated by reference.

BACKGROUND

1. Field

The invention relates to an image display device and a method of manufacturing the same. More particularly, the invention relates to a curved display device having a curved shape and a method of manufacturing the curved display device.

2. Description of the Related Art

A liquid crystal display ("LCD") includes two transparent substrates and a liquid crystal layer disposed between the two transparent substrates. The LCD drives liquid crystal molecules of the liquid crystal layer to control a light transmittance in each pixel, thereby displaying a desired image.

In a vertical alignment ("VA") mode LCD among various operation modes of the LCD, the liquid crystal molecules of the liquid crystal layer are vertically aligned with respect to the two substrates when an electric field is generated between the two substrates, and the vertically aligned liquid crystal molecules transmit the light, thereby display the image. The VA mode LCD includes liquid crystal domains required to align the liquid crystal molecules in different directions, and thus a viewing angle of the LCD is improved.

In recent years, a curved LCD has been developed. The curved LCD provides a user with a curved display panel, and thus the curved LCD provides the image having improved three-dimensional ("3D") effect, a sense of immersion, and virtual presence to the user.

SUMMARY

The invention provides a curved display device capable of effectively preventing stains from occurring at edges thereof and light from leaking.

The invention provides a method of manufacturing the curved display device.

Embodiments of the invention provide a curved display device includes a display substrate which is curved in a first direction in a plan view and includes a display area including a plurality of pixels configured to display an image and a peripheral area disposed adjacent to the display area, an opposite substrate coupled to the display substrate to face the display substrate and curved in the first direction along the display substrate, a grayscale control layer interposed between the display substrate and the opposite substrate, and a coupling member disposed in the peripheral area and interposed between the display substrate and the opposite substrate, and configured to couple the display substrate to the opposite substrate. The coupling member includes a first sealing portion extending in the first direction and the first sealing portion includes a light blocking material.

Embodiments of the invention provide a method of manufacturing a curved display device, including providing a display substrate which is curved in a first direction in a plan view and includes a display area including a plurality of pixels configured to display an image and a peripheral area disposed adjacent to the display area, providing an opposite substrate curved in the first direction along the display substrate, coating a sealant on one of the display substrate and the opposite substrate to provide a coupling member, assembling the opposite substrate with the display substrate, curing the sealant to couple the display substrate to the opposite substrate, and disposing a grayscale control layer between the display substrate and the opposite substrate. The coupling member includes a first sealing portion extending in the first direction and the first sealing portion includes a light blocking material.

According to the above, when the coupling member includes the light blocking material, the width of the coupling member is increased. As a result, edge stains, which are caused by the stress applied to the coupling member when the display device is curved, may be effectively prevented.

In addition, when the coupling member includes the light blocking material, a degree of freedom in designing a curing process to cure the coupling member by irradiating the ultraviolet ("UV") light is improved, and the coupling member may be effectively prevented from being uncured in portions thereof. Thus, the light leakage may be effectively prevented from occurring in the uncured portions of the coupling member.

BRIEF DESCRIPTION OF THE DRAWINGS

The above and other advantages of the invention will become readily apparent by reference to the following detailed description when considered in conjunction with the accompanying drawings, in which.

DETAILED DESCRIPTION

Figure 1A:
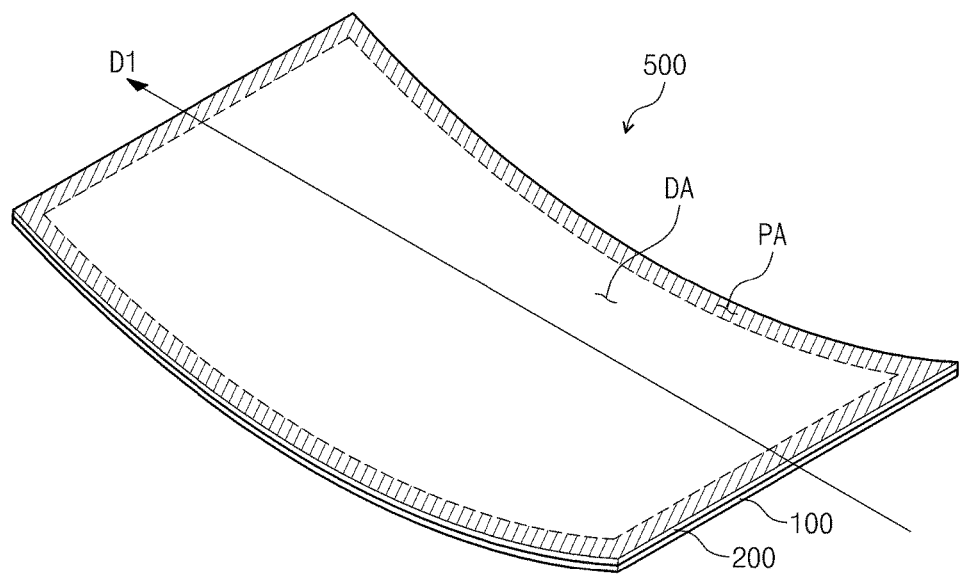
FIG. 1A is a perspective view showing an exemplary embodiment of a curved display device according to the invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
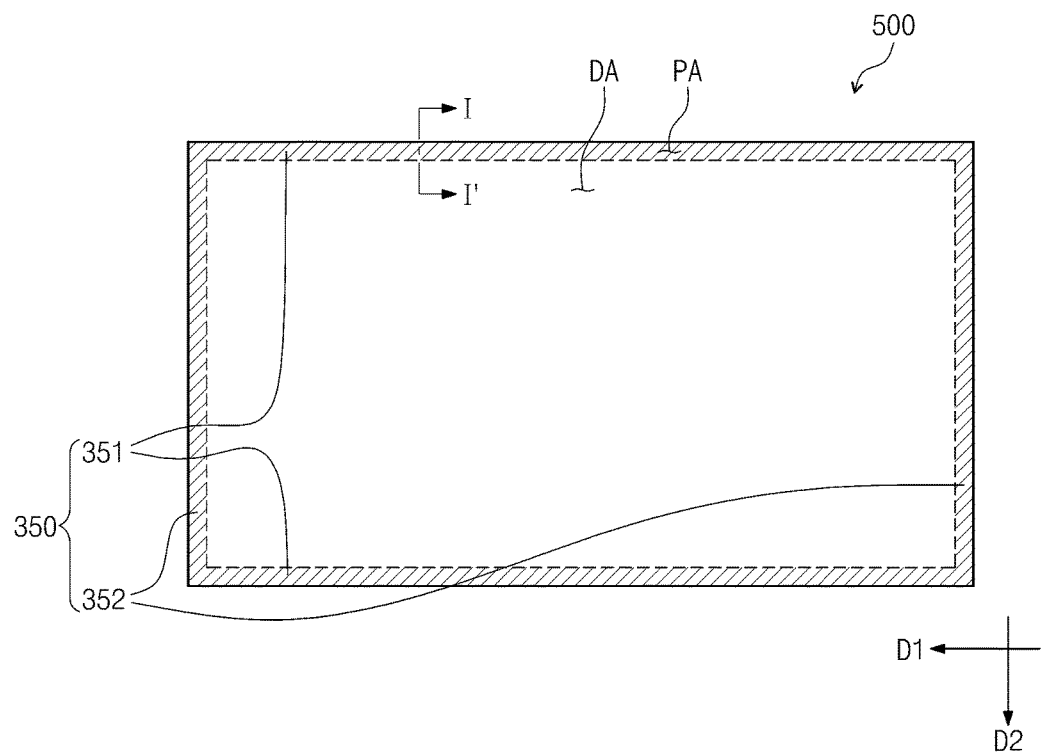
FIG. 1B is a plan view showing the curved display device shown in FIG. 1A.

FIG. 1A is a perspective view showing a curved display device according to an exemplary embodiment of the invention, and FIG. 1B is a plan view showing the curved display device shown in FIG. 1A.

Referring to FIGS. 1A and 1B, a curved display device 500 has a curved shape. The curved display device 500 includes a display area DA and a peripheral area PA disposed adjacent to the display area DA. The display area DA is an area in which an image is displayed. The peripheral area PA is disposed to surround the display area DA, and the peripheral area PA is an area through which light does not pass. The curved display device 500 may display the image having improved three-dimensional ("3D") effect, a sense of immersion, and virtual presence using the display area DA having a curved surface shape.

In the illustrated exemplary embodiment, the curved display device 500 includes a display substrate 100, an opposite substrate 200, and a grayscale control layer (not shown). The opposite substrate 200 is coupled to the display substrate 100 while facing the display substrate 100, and the grayscale control layer is interposed between the display substrate 100 and the opposite substrate 200.

Although not shown in figures, in addition to the display substrate 100 and the opposite substrate 200, the curved display device 500 may further include other elements, such as a backlight unit disposed at a rear side of the display substrate 100 to generate the light and a driving unit providing a driving signal to the display substrate 100, for example.

In the illustrated exemplary embodiment, the curved display device 500 is curved along a first direction D1 when viewed in a plan view. Thus, all or a portion of the display substrate 100 has a curved shape that is bent along the first direction D1 and the display area DA has the curved surface shape along the first direction D1. In addition, the opposite substrate 200 may be curved in the first direction D1 to correspond to the curved shape of the display substrate 100.

Figure 2:
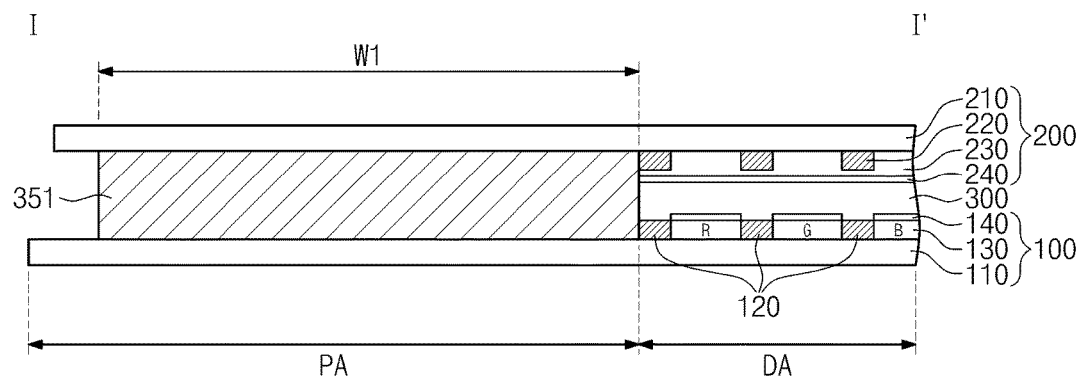
FIG. 2 is a cross-sectional view taken along line of I-I' of FIG. 1B.

FIG. 2 is a cross-sectional view taken along line of I-I' of FIG. 1B.

Referring to FIGS. 1B and 2, the curved display device 500 includes the display substrate 100, the opposite substrate 200 facing the display substrate 100, the grayscale control layer 300 interposed between the display substrate 100 and the opposite substrate 200 to control the grayscale, and a coupling member 350 interposed between the display substrate 100 and the opposite substrate 200 to couple the display and the opposite substrates 100 and 200.

The coupling member 350 is disposed in the peripheral area PA to couple the display substrate 100 and the opposite substrate 200. The coupling member 350 is disposed along the peripheral area PA to have a closed loop shape. In an exemplary embodiment, the peripheral area PA corresponds to an area in which the coupling member 350 is disposed.

However, in another exemplary embodiment, the coupling member 350 has a width W1 smaller than a width of the peripheral area PA. In the illustrated exemplary embodiment, the coupling member 350 includes a light blocking material and is disposed over an entire area of the peripheral area PA.

The grayscale control layer 300 is interposed between the display substrate 100 and the opposite substrate 200 in the display area DA. In an exemplary embodiment, the grayscale control layer 300 may include a liquid crystal layer, an electrowetting layer, or an electrophoretic layer, for example.

As shown in FIG. 2, the display substrate 100 includes a first base substrate 110, a thin film transistor ("TFT") 120, an organic insulating layer 130 having red, green, and blue colors R, G, and B, and a pixel electrode 140.

The first base substrate 110 includes a transparent glass substrate or a transparent flexible substrate. The first base substrate 110 has a curved shape in the first direction D1 as shown in FIG. 1A. A plurality of pixels is disposed on the first base substrate 110 in the display area DA.

Each of the pixels includes the TFT 120 and the pixel electrode 140. The TFT 120 serves as a switching device to switch a pixel voltage applied to the pixel electrode 140, and the TFT 120 is electrically connected to the pixel electrode 140. The pixel electrode 140 is disposed to be electrically insulated from a pixel electrode of an adjacent pixel thereto. Thus, a voltage applied to the pixel electrode 140 may be controlled in each pixel. In an exemplary embodiment, the pixel electrode 140 includes a transparent conductive oxide ("TCO"), such as an indium tin oxide ("ITO"), for example.

The organic insulating layer 130 is disposed such that each pixel has the red color R, the green color G, or the blue color B. In an exemplary embodiment, the organic insulating layer 130 may include a transparent material, and in this case, a red color pixel layer, a green color pixel layer, and a blue color pixel layer, for example, may be disposed on the opposite substrate 200.

The opposite substrate 200 includes a second base substrate 210, a black matrix 220, an overcoat layer 230, and a common electrode 240. The second base substrate 210 is coupled to the first base substrate 110 while facing the first base substrate 110, and the second base substrate 210 includes the same material as that of the first base substrate 110 to have a curved shape in the first direction D1.

The black matrix 220 is disposed on the second base substrate 210 in a partial area of the display area DA. Particularly, the black matrix 220 is disposed on the second base substrate 210 in the partial area of the display area DA, in which the image is substantially not displayed, e.g., an area in which the TFT 120 is disposed or an area in which signal lines connected to the pixel are disposed. In an exemplary embodiment, the black matrix 220 includes an organic insulating material having a light blocking property or a metal material such as chromium (Cr), for example.

As shown in FIG. 2, since the coupling member 350 having the light blocking property is disposed in the peripheral area PA, the black matrix 220 may be disposed only in the display area DA and omitted from the peripheral area PA.

The overcoat layer 230 is provided on the black matrix 220 and the second base substrate 210 to compensate for a step difference between the black matrix 220 and the second base substrate 210. In an exemplary embodiment, the overcoat layer 230 includes a transparent organic insulating material.

Although not shown in figures, in a case that a color filter layer is disposed on the opposite substrate 200, the overcoat layer 230 is disposed to cover the black matrix 220 and the color filter layer to compensate for a step difference between the black matrix 220 and the color filter layer.

The common electrode 240 is disposed on the overcoat layer 230. The common electrode 240 receives a reference voltage and generates an electric field in cooperation with the pixel electrode 140 facing the common electrode 240. Thus, a light transmittance of the grayscale control layer 300 is controlled depending on an intensity of the electric field. In an exemplary embodiment, the common electrode 240 includes a TCO, e.g., ITO.

As shown in FIGS. 1A and 1B, when the curved display device 500 is curved in the first direction D1, a stress is applied to the coupling member 350 disposed in the peripheral area PA. Hereinafter, a portion of the coupling member 350 disposed substantially in parallel to the first direction D1 is referred to as a first sealing portion 351 and a portion of the coupling member 350 disposed substantially in parallel to a second direction D2, which is substantially perpendicular to the first direction D1, is referred to as a second sealing portion 352. When the curved display device 500 is curved in the first direction D1, the stress applied to the first sealing portion 351 is relatively increased. When the stress is increased, photoelasticity phenomenon occurs in the coupling member 350. Consequently, stains may be visible at edges of the peripheral area PA due to the photoelasticity phenomenon of the coupling member 350.

Referring to FIG. 2, the stress is reduced as the width W1 of the coupling member 350 increases. As shown in FIG. 2, when the coupling member 350 includes the light blocking material, the coupling member 350 may be disposed over the entire area of the peripheral area PA. Thus, the width W1 of the coupling member 350 may increase in overall, and the stains, which are caused by the stress, may be prevented from occurring at the edges of the peripheral area PA.

In addition, when the coupling member 350 includes the light blocking material, a peripheral black matrix disposed in the peripheral area PA may be omitted, thereby increasing a degree of freedom in designing a curing process to cure the coupling member 350 by irradiating the ultraviolet ("UV") light. That is, the coupling member 350 may be cured by the UV light provided from the opposite substrate 200. Also, the coupling member 350 may be prevented from being uncured in portions thereof, which is caused when the UV light is not provided to portions of the coupling member 350 during the curing process. A light leakage may occur in the peripheral area PA when the coupling member 350 is not cured, but the light leakage caused by the non-cured coupling member 350 may be prevented since the coupling member 350 includes the light blocking material.

Figure 3:
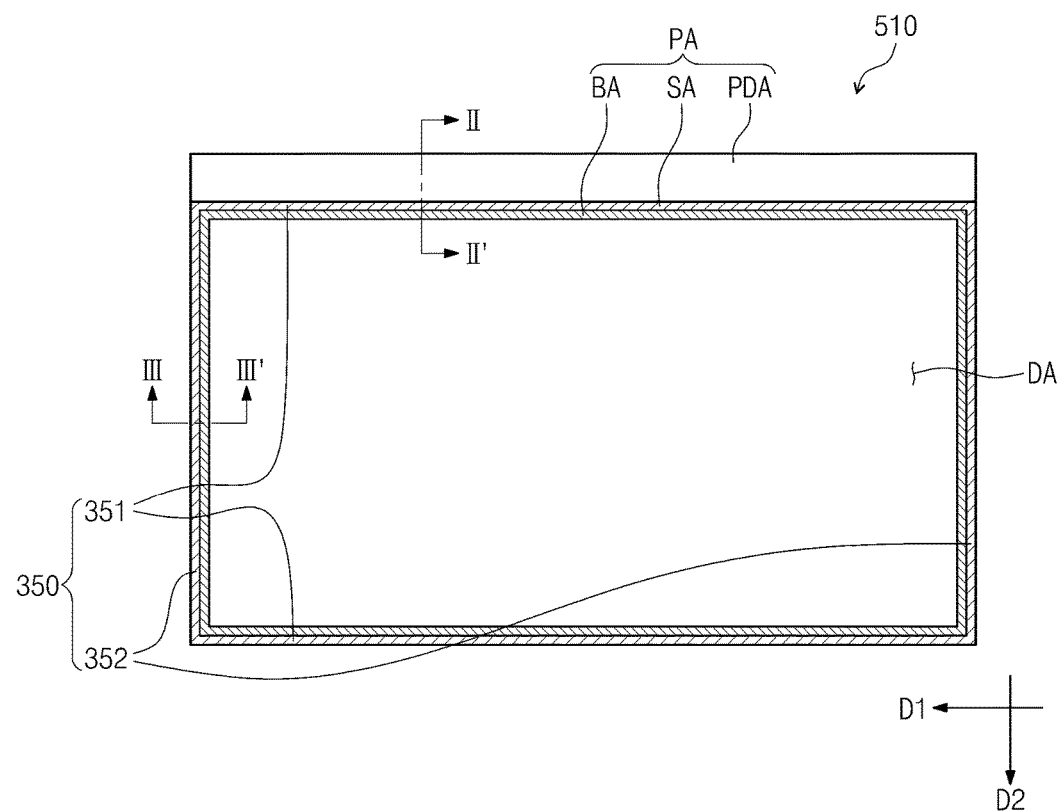
FIG. 3 is a plan view showing another exemplary embodiment of a curved display device according to the invention.
Figure 4A:
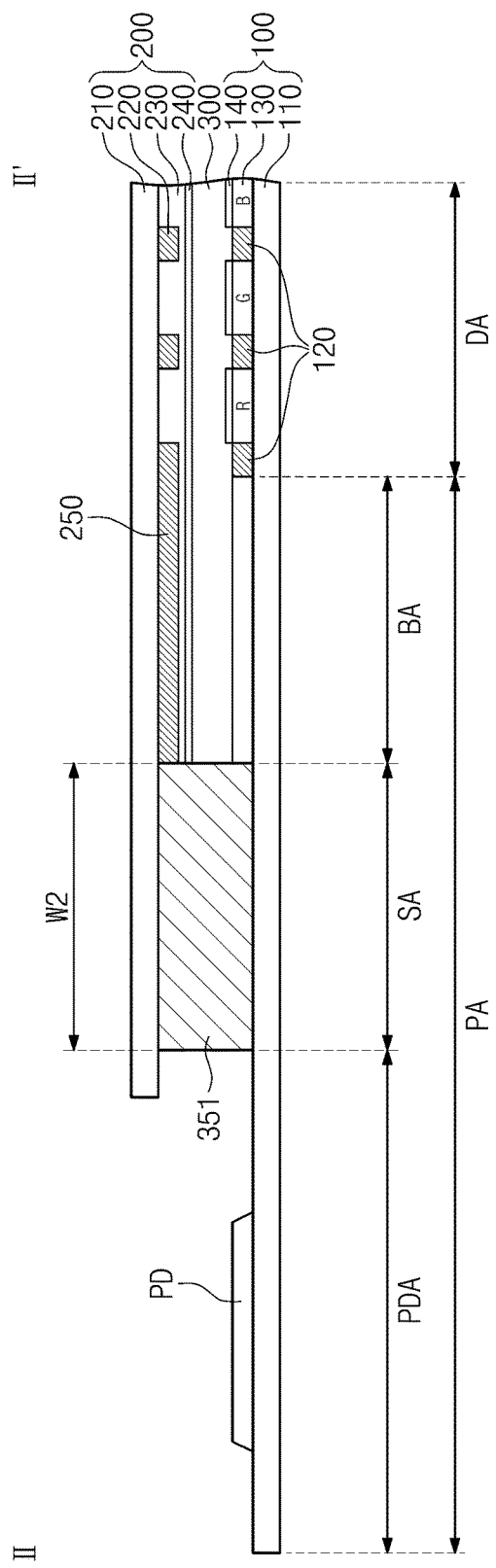
FIG. 4A is a cross-sectional view taken along line II-II' of FIG. 3.
Figure 4B:
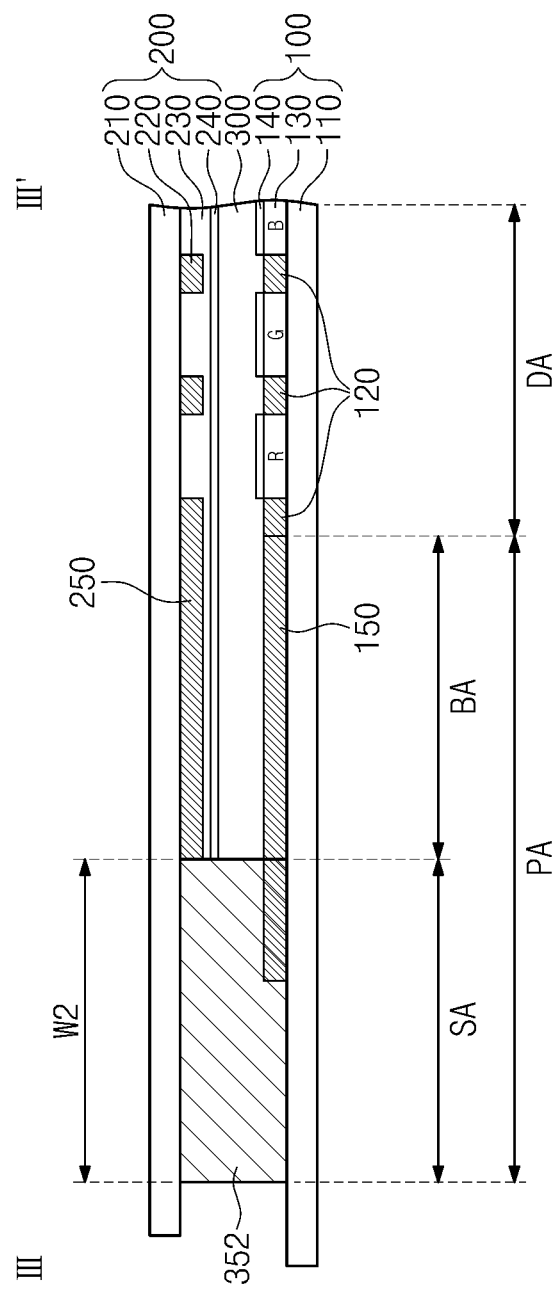
FIG. 4B is a cross-sectional view taken along line of FIG. 3.

FIG. 3 is a plan view showing a curved display device according to another exemplary embodiment of the invention, FIG. 4A is a cross-sectional view taken along line II-II' of FIG. 3, and FIG. 4B is a cross-sectional view taken along line of FIG. 3. In FIGS. 3, 4A, and 4B, the same reference numerals denote the same elements in FIGS. 1A, 1B, and 2, and thus the detailed descriptions of the same elements will be omitted.

Referring to FIGS. 3 and 4A, a curved display device 510 includes a display area DA and a peripheral area PA disposed adjacent to the display area DA. The display area DA is an area in which an image is displayed. The peripheral area PA is disposed to surround the display area DA, and the peripheral area PA is an area through which light does not pass. The peripheral area PA includes a seal line area SA in which a coupling member 350 is disposed and a black matrix area BA in which a peripheral black matrix 250 is disposed.

In addition, the peripheral area PA may further include a pad area PDA in which pads PD are disposed to receive signals from the outside thereof and apply the signals to the display area DA. The pad area PDA may be disposed along one side of the curved display device 510. The pad area PDA is disposed outside the seal line area SA. Particularly, the pad area PDA is defined in the display substrate 100, and the pad area PDA may be an area in which the display substrate 100 is exposed to the outside without facing the opposite substrate 200. Thus, the pads PD disposed in the pad area PDA are exposed to the outside and electrically connected to driving units applying the signals to the curved display device 510.

The peripheral black matrix 250 is disposed on a second base substrate 210. The peripheral black matrix 250 includes the same material as that of a black matrix 220 disposed in the display area DA and is substantially simultaneously patterned together with a black matrix 220 through the same process.

The coupling member 350 includes a light blocking material, and a width W2 of the coupling member 350 is determined depending on a curvature radius of the curved display device 510. Particularly, the width W2 in a second direction D2 of a first sealing portion 351 of the coupling member 350, which is substantially perpendicular to a first direction D1 in which the curved display device 510 is curved, is determined depending on the curvature radius of the curved display device 510. Thus, the stress applied to the first sealing portion 351, which is caused by the curved shape, is reduced and stains caused by the photoelasticity phenomenon may be prevented from occurring at edges.

When the width W2 of the coupling member 350 is determined, the peripheral black matrix 250 is provided to the peripheral area PA without being overlapped with the coupling member 350. Whether or not the peripheral black matrix 250 is overlapped with the coupling member 350 is determined depending on whether the display substrate 100 or the opposite substrate 200 provides the UV light during the curing process of the coupling member 350. In the case that the UV light is provided from the opposite substrate 200 to cure the coupling member 350, the peripheral black matrix 250 is disposed not to overlap with the coupling member 350 such that the UV light is incident to the coupling member 350.

Referring to FIG. 4B, the display substrate 100 includes a gate driving circuit 150 to apply a gate signal to the display area DA. The gate driving circuit 150 is provided through the same thin film process as the TFT 120.

The gate driving circuit 150 is disposed in an area covered by the peripheral black matrix 250 and partially overlapped with the seal line area SA. Particularly, during an upper exposure process in which the coupling member 350 is cured by the UV light provided from the opposite substrate 200, the coupling member 350 is prevented from being uncured even though the gate driving circuit 150 is overlapped with the coupling member 350.

Figure 5:
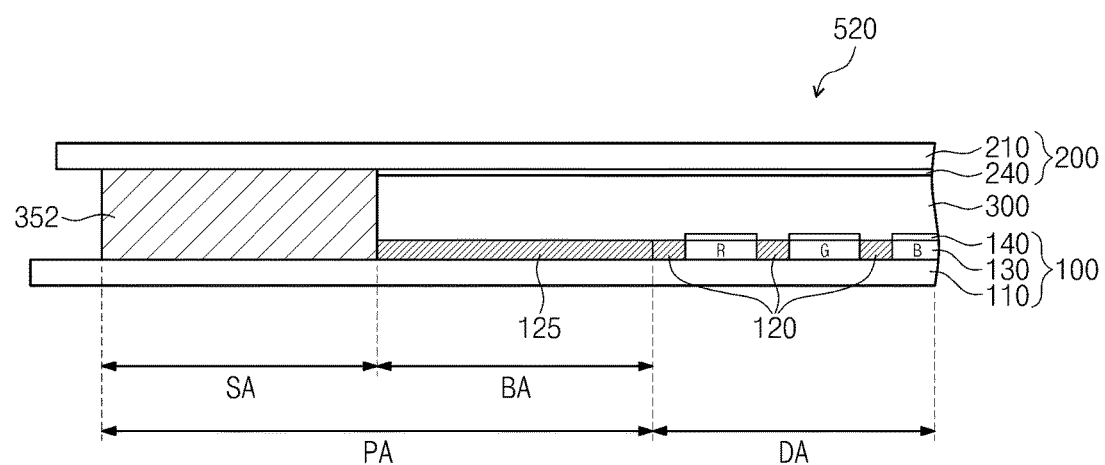
FIG. 5 is a cross-sectional view showing another exemplary embodiment of a curved display device according to the invention.

FIG. 5 is a cross-sectional view showing a curved display device according to another exemplary embodiment of the invention.

Referring to FIG. 5, a peripheral area PA of a curved display device 520 includes a seal line area SA in which a coupling member 350 is disposed and a black matrix area BA in which a peripheral black matrix 125 is disposed.

The peripheral black matrix 125 is disposed on a first base substrate 110. In the case that the peripheral black matrix 125 is disposed on the first base substrate 110, the display substrate 100 may further include a black matrix (not shown) disposed in the display area DA. In an exemplary embodiment, the black matrix may be disposed to cover a TFT 120 and signal lines. In addition, the peripheral black matrix 125 may include the same material as that of the black matrix and may be substantially simultaneously patterned together with the black matrix.

In a case that the coupling member 350 is cured by a UV light provided from an opposite substrate 200, there is no problem when the black matrix 125 is overlapped with the coupling member 350 since the peripheral black matrix 125 is disposed on the display substrate 100.

In a case that the coupling member 350 is cured by the UV light provided from the display substrate 100, the peripheral black matrix 125 is disposed not to be overlapped with the coupling member 350 since the peripheral black matrix 125 is disposed in the display substrate 100. Therefore, the coupling member 350 may be prevented from being uncured.

Figure 6:
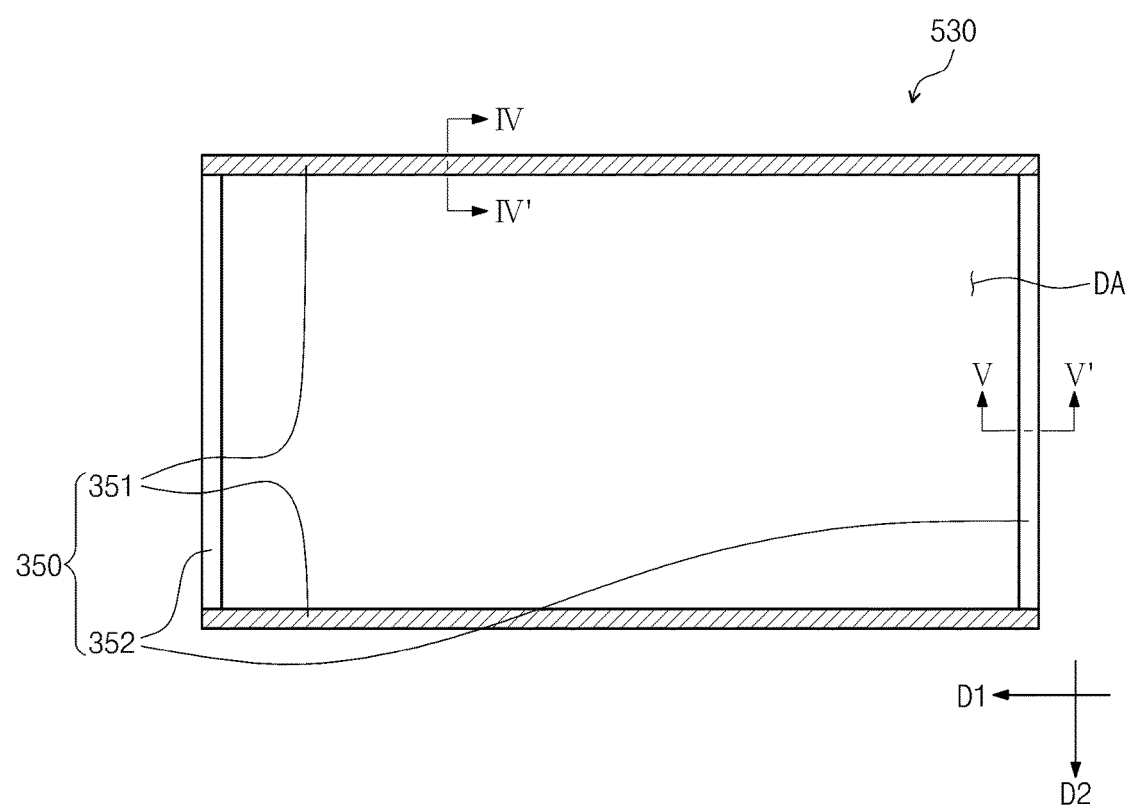
FIG. 6 is a plan view showing another exemplary embodiment of a curved display device according to the invention.
Figure 7:
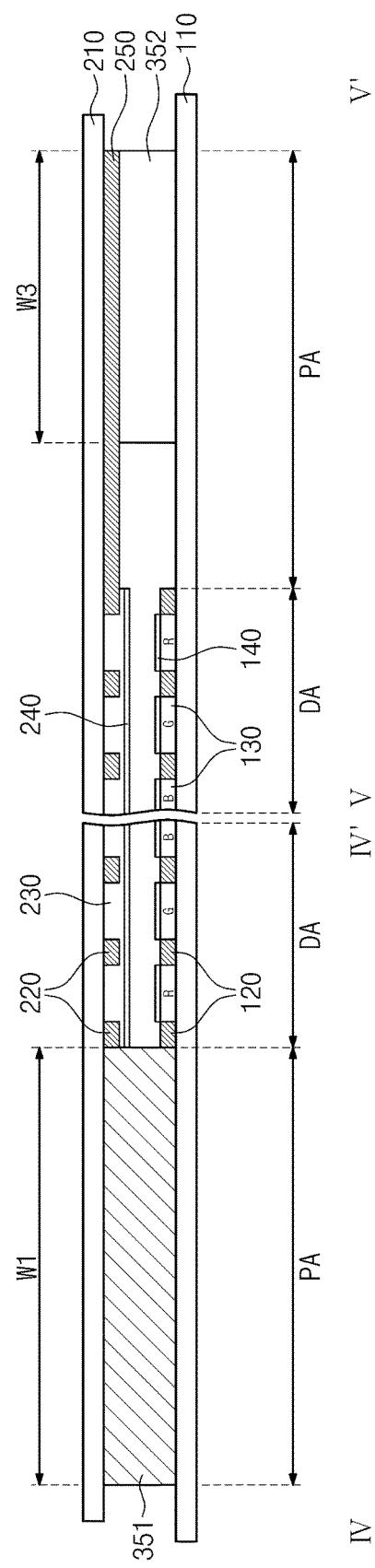
FIG. 7 is a cross-sectional view taken along lines IV-IV' and V-V' of FIG. 6.

FIG. 6 is a plan view showing a curved display device according to another exemplary embodiment of the invention, and FIG. 7 is a cross-sectional view taken along lines IV-IV' and V-V' of FIG. 6.

Referring to FIGS. 6 and 7, a coupling member 350 of a curved display device 530 includes a first sealing portion 351 extending in parallel to a first direction D1 and a second sealing portion 352 extending in parallel to a second direction D2.

When the curved display device 530 is curved in the first direction D1, the first sealing portion 351 includes a light blocking material, and a width W1 of the first sealing portion 351 is determined depending on a curvature radius of the curved display device 530. Thus, a stress, which is applied to the first sealing portion 351 due to a curved shape, may be reduced, and stains caused by the photoelasticity phenomenon may be prevented from occurring at edges.

When the curved display device 530 is curved in the first direction D1, the stress caused by the curved shape is not applied to the second sealing portion 352, or relatively less stress is applied to the second sealing portion 352 when compared to the stress applied to the first sealing portion 351. Therefore, the stains do not occur at edges of the second sealing portion 352, and a width W3 in the first direction D1 of the second sealing portion 352 does not need to be increased. To this end, the second sealing portion 352 may include a transparent material, and the width W1 of the first sealing portion 351 in the second direction D2 may be greater than the width W3 of the second sealing portion 352 in the first direction D1.

As shown in FIG. 7, when the second sealing portion 352 includes the transparent material, an opposite substrate 200 may further include a peripheral black matrix 250 disposed to cover the second sealing portion 352.

In another exemplary embodiment, when a UV light is provided from the opposite substrate 200 to cure the coupling member 350 during a curing process, the display substrate 100 may include a peripheral black matrix (not shown) disposed to correspond to the second sealing portion 352.

Figure 8:
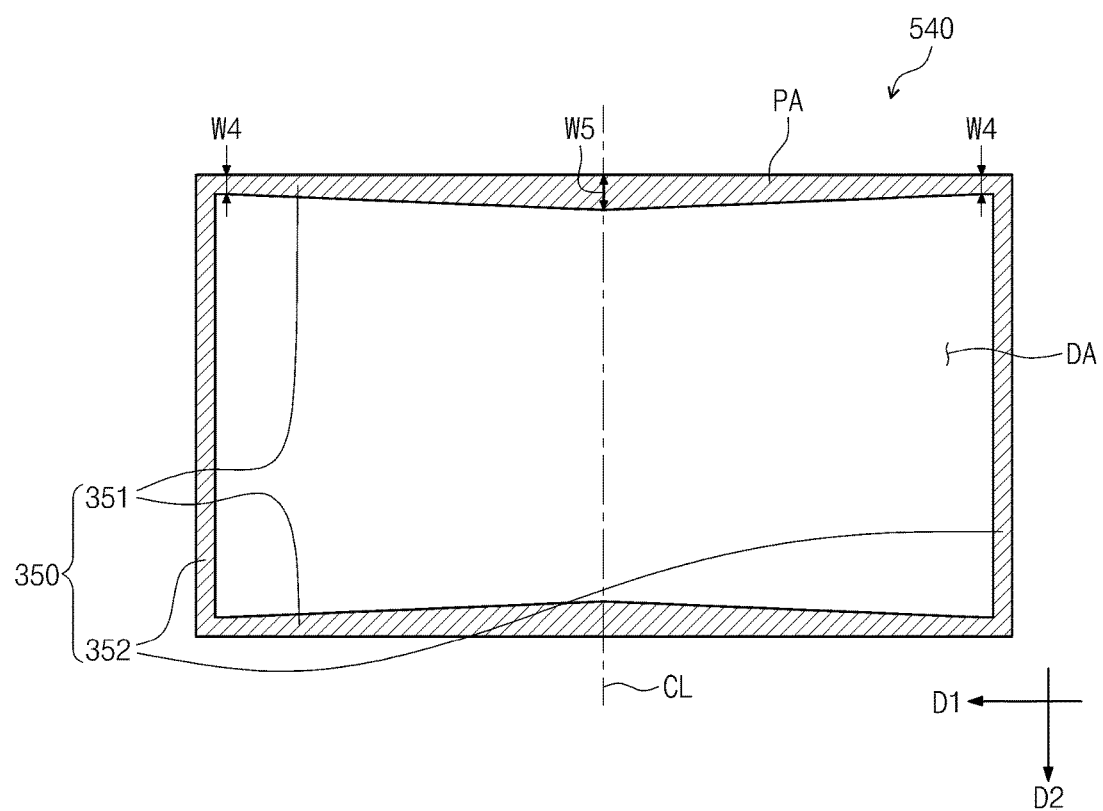
FIG. 8 is a plan view showing another exemplary embodiment of a curved display device according to the invention.

FIG. 8 is a plan view showing a curved display device according to another exemplary embodiment of the invention.

Referring to FIG. 8, a coupling member 350 of a curved display device 540 includes a first sealing portion 351 extending substantially in parallel to a first direction D1 and a second sealing portion 352 extending substantially in parallel to a second direction D2 and coupled to the first sealing portion 351.

The first sealing portion 351 includes a light blocking material. In addition, the first sealing portion 351 may have different widths with reference to a center line CL, which crosses a center portion of a display area DA in a plan view and is substantially parallel to the second direction D2. In an exemplary embodiment, the first sealing portion 351 has a maximum width (i.e., a width W5) at the center line CL. As shown in FIG. 8, the width of the first sealing portion 351 in the second direction D2 increases as a distance from the center line CL decreases when viewed in a plan view.

Although not shown in figures, the width of the first sealing portion 351 in the second direction D2 may be increased with a step shape. In an alternative exemplary embodiment, when the first sealing portion 351 is divided into a first area including the center line CL and a second area except for the first area, the width W5 of the first sealing portion 351 in the first area may be set to be greater than a width W4 of the first sealing portion 351 in the second area.

When the curved display device 540 is curved in the first direction D1 with reference to the center line CL, the first sealing portion 351 may be applied with maximum stress in the area near the center line CL. Thus, the width W5 of the first sealing portion 351 in the area near the center line CL is set to be greater than the width of the first sealing portion 351 in the other area of the first sealing portion 351.

The width of the second sealing portion 352 in the first direction D1 may be uniform regardless of positions thereof.

Figure 9:
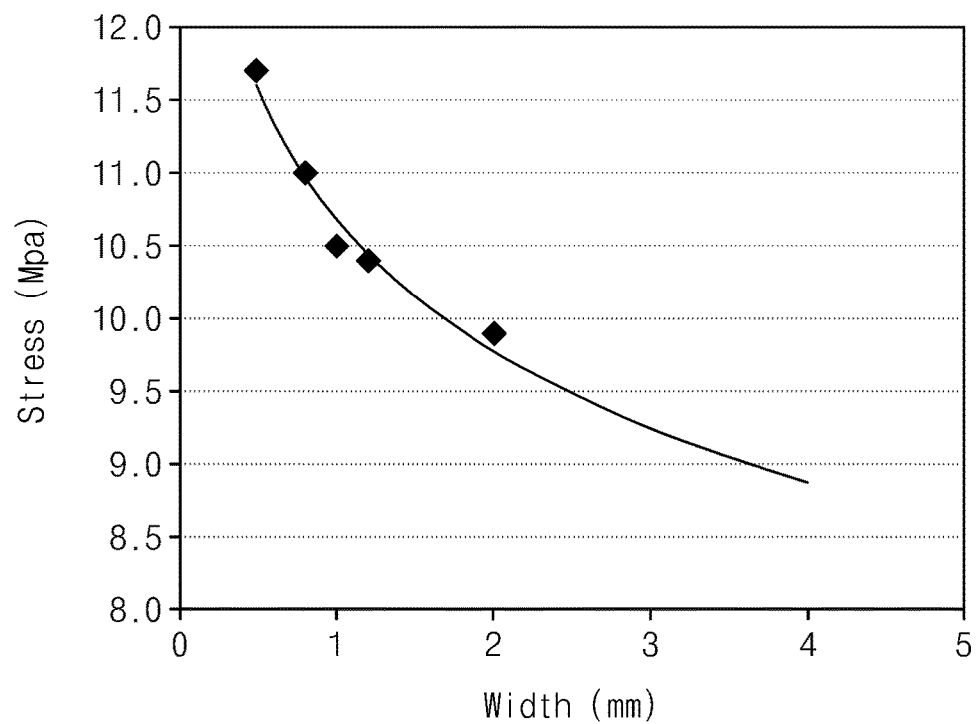
FIG. 9 is a graph showing a variation in stress depending on a width of a coupling member.
Figure 10A:
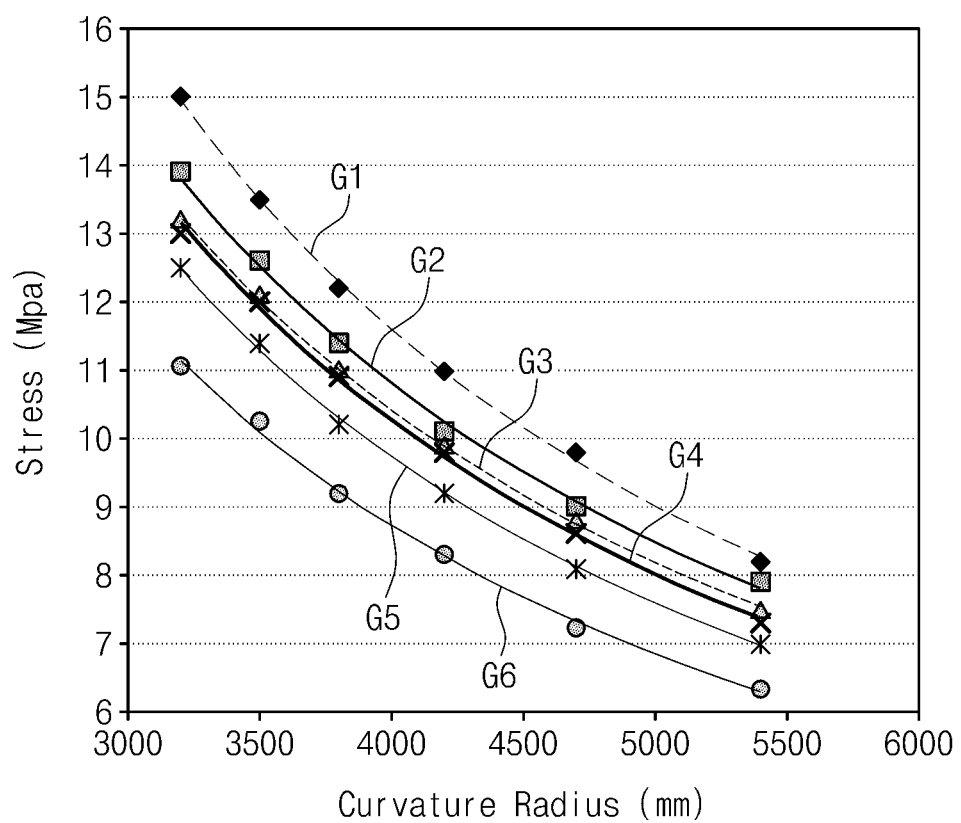
FIG. 10A is a graph showing a variation in stress depending on a curvature radius of the curved display device.
Figure 10B:
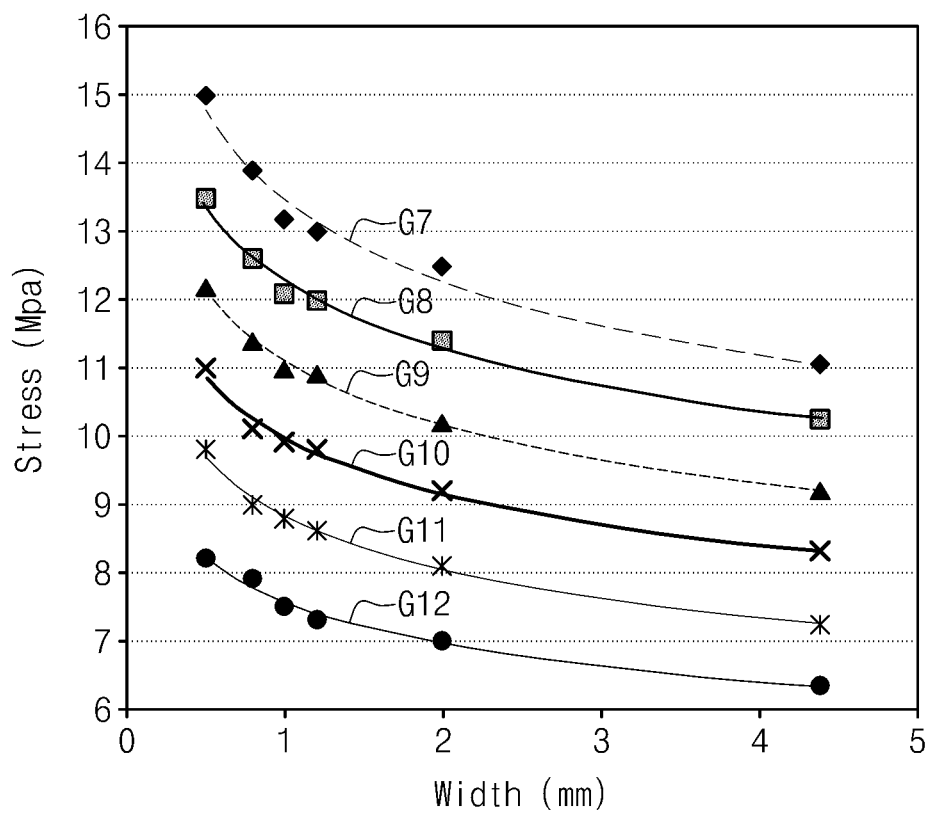
FIG. 10B is a graph showing a variation in stress depending on a width of a coupling member.

FIG. 9 is a graph showing a variation in stress measured in terms of megapascals (Mpa) depending on the width of the coupling member measured in terms of millimeters (mm), FIG. 10A is a graph showing a variation in stress measured in terms of megapascals (Mpa) depending on the curvature radius of the curved display device measured in terms of millimeters (mm), and FIG. 10B is a graph showing a variation in stress measured in terms of megapascals (Mpa) depending on the width of the coupling member measured in terms of millimeters (mm).

Referring to FIG. 9, as the width of the first sealing portion 351 increases, the intensity of the stress applied to the first sealing portion 351 is reduced. When the intensity of the stress, which does not cause the stains at edges, is determined, the width of the first sealing portion 351 may be set depending on the intensity of the stress. In an exemplary embodiment, as shown in FIG. 9, when the intensity of the stress, which does not cause the stains at edges in each product, is determined to be smaller than about 10.4 Mpa, the width of the first sealing portion 351 is set to have a value equal to or greater than about 1.2 mm.

In FIG. 10A, first to sixth graphs G1 to G6 show the variations in stress depending on the curvature radius when the first sealing portion 351 has widths of about 0.5 mm, about 0.8 mm, about 1.0 mm, about 1.2 mm, about 2.0 mm, and about 4.4 mm, respectively. In FIG. 10B, seventh to twelfth graphs G7 to G12 show the variations in stress depending on the width of the first sealing portion 351 when the curved display device has the curvature radiuses of about 3200 mm, about 3500 mm, about 3800 mm, about 4200 mm, about 4700 mm, and about 5400 mm, respectively.

Referring to FIGS. 10A and 10B, as the width of the first sealing portion 351 increases, the intensity of the stress is reduced. In addition, as the curvature radius increases, the intensity of the stress is reduced. Thus, in order to set the intensity of the stress to a predetermined value, it is preferred to increase the width of the first sealing portion 351 as the curvature radius is reduced.

TABLE 1

|  | 0.5 mm | 0.8 mm | 1.0 mm | 1.2 mm | 2.0 mm | 4.4 mm |
| --- | --- | --- | --- | --- | --- | --- |
| 3200 mm | 15.0 Mpa | 13.9 Mpa | 13.2 Mpa | 13.0 Mpa | 12.5 Mpa | 11.1 Mpa |
| 3500 mm | 13.5 Mpa | 12.6 Mpa | 12.1 Mpa | 12.0 Mpa | 11.4 Mpa | 10.3 Mpa |
| 3800 mm | 12.2 Mpa | 11.4 Mpa | 11.0 Mpa | 10.9 Mpa | 10.2 Mpa | 9.2 Mpa |
| 4200 mm | 11.0 Mpa | 10.1 Mpa | 9.9 Mpa | 9.8 Mpa | 9.2 Mpa | 8.3 Mpa |
| 4700 mm | 9.8 Mpa | 9.0 Mpa | 8.8 Mpa | 8.6 Mpa | 8.1 Mpa | 7.2 Mpa |
| 5400 mm | 8.2 Mpa | 7.9 Mpa | 7.5 Mpa | 7.3 Mpa | 7.0 Mpa | 6.3 Mpa |

Referring to Table 1, an allowable width of the first sealing portion 351 according to the curvature radius is shown in bold type when the maximum marginal stress, which does not cause the stains at edges, is set to be about 10.4 Mpa. According to Table 1, when the first sealing portion 351 has the width of about 4.4 mm, no edge stains occur when the curvature is in a range from about 3500 mm to about 5400 mm.

When the curvature radius of the curved display device 500 is set and the maximum marginal stress, which does not cause the edge stains, is determined, the width of the first sealing portion 351 may be obtained. When the first sealing portion 351 includes the light blocking material, a degree of freedom in designing the width of the first sealing portion 351 is increased, thereby preventing the edge stains from occurring, which are caused by the stress.

Figure 11:
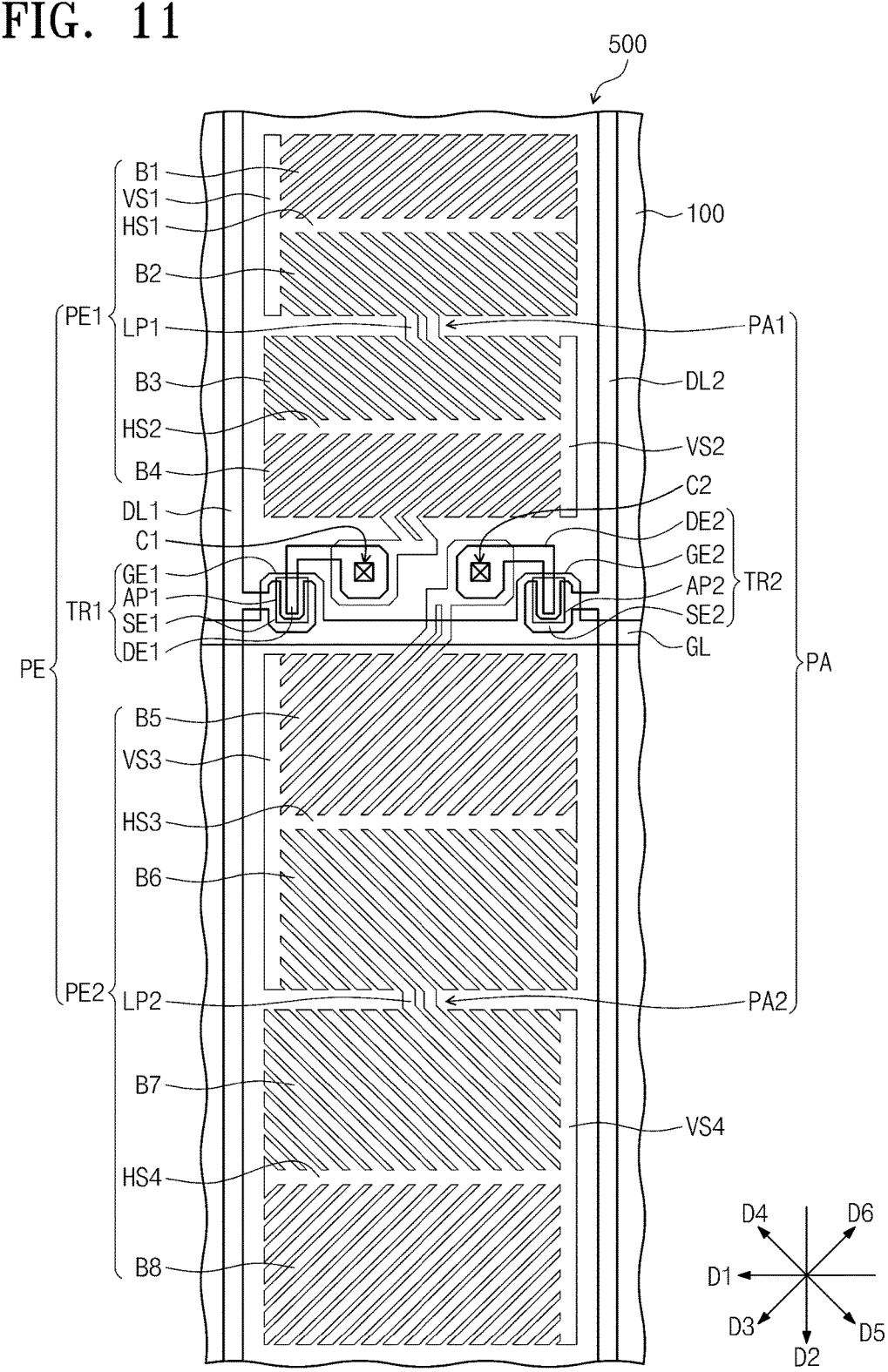
FIG. 11 is a plan view showing an exemplary embodiment of a pixel of the curved display device according to the invention.
Figure 12:
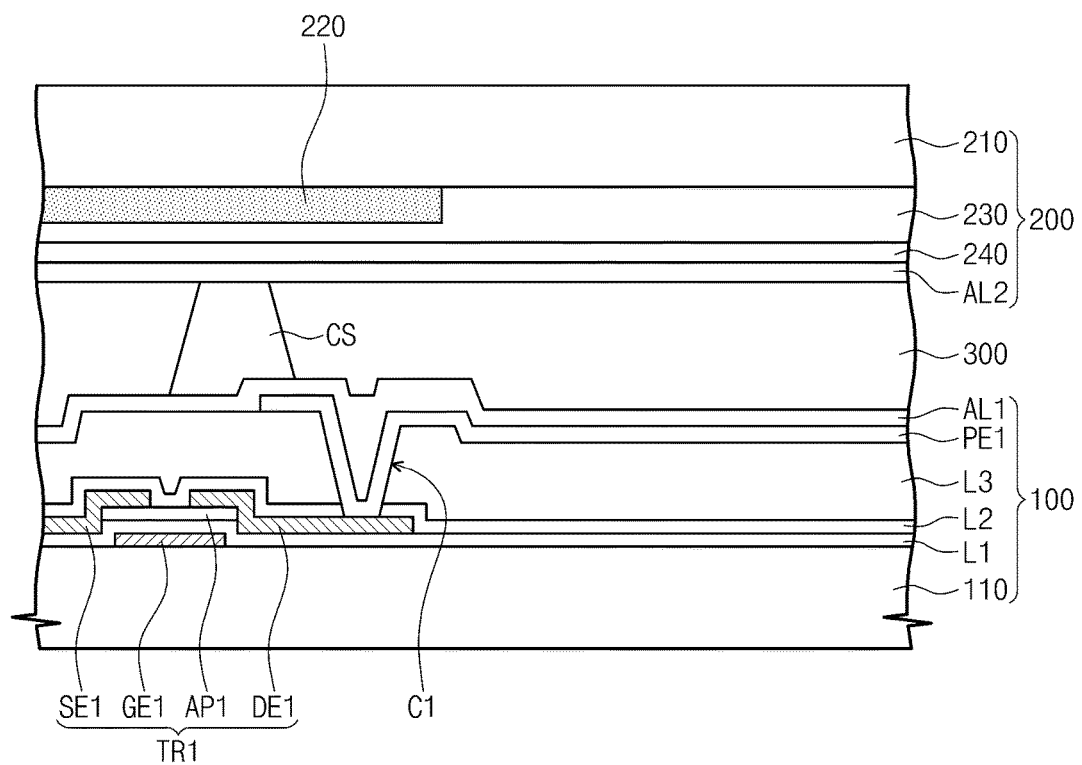
FIG. 12 is a cross-sectional view of FIG. 11.

FIG. 11 is a plan view showing a pixel of the curved display device according to an exemplary embodiment of the invention, and FIG. 12 is a cross-sectional view of FIG. 11.

The curved display device 500 includes a plurality of pixels, but only one pixel area PA in which one pixel is disposed is illustrated and the other pixel areas and the pixels will be omitted in FIG. 11. In addition, FIG. 11 shows a plan structure of the display substrate 100 of the curved display device 500, and a cross-sectional structure of the curved display device 500 is shown in FIG. 12.

Referring to FIGS. 11 and 12, the curved display device 500 includes the display substrate 100, the opposite substrate 200, and a liquid crystal layer 300. The opposite substrate 200 is coupled to the display substrate 100 while facing the display substrate 100, and the liquid crystal layer 300 is interposed between the display substrate 100 and the opposite substrate 200.

The curved display device 500 may further include other elements in addition to the display substrate 100 and the opposite substrate 200, and the curved display device 500 should not be limited to the above-described elements. In an exemplary embodiment, the curved display device 500 may further include a backlight unit (not shown) providing a light to the display substrate 100 and the opposite substrate 200, however, the backlight unit may be omitted.

The display substrate 100 includes a first base substrate 110, a gate line GL, a first data line DL1, a second data line DL2, a first TFT TR1, a second TFT TR2, a pixel electrode PE, and a spacer CS.

The gate line GL is disposed on the first base substrate 110, and is electrically connected to the first and second TFTs TR1 and TR2 to apply a gate signal to the first and second TFTs TR1 and TR2.

In the illustrated exemplary embodiment, when an area in which the pixel electrode PE is disposed is referred to as the pixel area PA, the pixel area PA includes a first sub-pixel area PA1 and a second sub-pixel area PA2. Then, the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are insulated from the gate line GL and disposed on the first base substrate 110. The first data line DL1 applies a first data signal to the first TFT TR1 and the second data line DL2 applies a second data signal to the second TFT TR2. In the exemplary embodiment, the first data line DL1 extends along one side (e.g., left side) of the first and second sub-pixel electrodes PE1 and PE2, and the second data line DL2 extends along the other side (e.g., right side) of the first and second sub-pixel electrodes PE1 and PE2. Thus, the first and second sub-pixel electrodes PE1 and PE2 are disposed between the first data line DL1 and the second data line DL2.

The first TFT TR1 is electrically connected to the gate line GL, the first data line DL1, and the first sub-pixel electrode PE1. When the first TFT TR1 is turned on in response to the gate signal, the first data signal is applied to the first sub-pixel electrode PE1.

In detail, the first TFT TR1 includes a first gate electrode GE1, a first active pattern AP1, a first source electrode SE1, and a first drain electrode DE1. The first gate electrode GE1 is branched from the gate line GL, and the first active pattern AP1 is disposed on the first gate electrode GE1 while a first insulating layer L1 is interposed between the first gate electrode GE1 and the first active pattern AP1. The first source electrode SE1 is branched from the first data line DL1 to make contact with the first active pattern AP1, and the first drain electrode DE1 is spaced apart from the first source electrode SE1 to make contact with the first active pattern AP1. In an exemplary embodiment, the first source electrode SE1 and the first drain electrode DE1 are disposed on end portions of the first active pattern AP1, respectively.

The second TFT TR2 is electrically connected to the gate line GL, the second data line DL2, and the second sub-pixel electrode PE2. Thus, when the second TFT TR2 is turned on in response to the gate signal, the second data signal is applied to the second sub-pixel electrode PE2.

In detail, the second TFT TR2 includes a second gate electrode GE2, a second active pattern AP2, a second source electrode SE2, and a second drain electrode DE2. The second gate electrode GE2 is branched from the gate line GL, and the second active pattern AP2 is disposed on the second gate electrode GE2 while the first insulating layer L1 is interposed between the second gate electrode GE2 and the second active pattern AP2. The second source electrode SE2 is branched from the second data line DL2 to make contact with the second active pattern AP2, and the second drain electrode DE2 is spaced apart from the second source electrode SE2 to make contact with the second active pattern AP2. In an exemplary embodiment, the second source electrode SE2 and the second drain electrode DE2 are disposed on end portions of the second active pattern AP2, respectively.

In an exemplary embodiment, the first and second active patterns AP1 and AP2 may include a semiconductor material, such as amorphous silicon, crystalline silicon, etc. According to another exemplary embodiment, however, the first and second active patterns AP1 and AP2 may include an oxide semiconductor, such as indium gallium zinc oxide ("IGZO"), ZnO, $SnO_2$, $In_2O_3$, $Zn_2SnO_4$, $Ge_2O_3$, and $HfO_2$, for example, or a compound semiconductor, such as GaAs, GaP, and InP, for example.

A second insulating layer L2 covers the first and second TFTs TR1 and TR2, and a third insulating layer L3 is disposed on the second insulating layer L2. In an exemplary embodiment, the second insulating layer L2 may include an inorganic insulating material, and the third insulating layer L3 may include an organic insulating material. In an exemplary embodiment, the third insulating layer L3 may be a color filter layer including a red color pixel, a green color pixel, and a blue color pixel, for example.

The first sub-pixel electrode PE1 makes contact with the first drain electrode DE1 through a first contact hole C1 penetrating through the second and third insulating layers L2 and L3. The second sub-pixel electrode PE2 makes contact with the second drain electrode DE2 through a second contact hole C2 penetrating through the second and third insulating layers L2 and L3.

As described above, the first and second sub-pixel electrodes PE1 and PE2 are driven by different data signals such that different grayscales are displayed in the first and second sub-pixel areas PA1 and PA2, respectively.

A first alignment layer AL1 is disposed on the first and second sub-pixel electrodes PE1 and PE2. When electric field is not generated between the display substrate 100 and the opposite substrate 200, the first alignment layer AL1 aligns liquid crystal molecules of the liquid crystal layer 300 in a direction inclined with respect to the first alignment layer AL1. Then, when the electric field is generated, the liquid crystal molecules, which are inclined with respect to the first alignment layer AL1, are further tilted by the electric field, and thus the liquid crystal molecules are aligned in a direction substantially in parallel to the display substrate 100. The liquid crystal molecules driven by the electric field is called a super vertical alignment ("SVA") mode, and a response time required to display the image of the curved display device 500 is improved.

The spacer CS is disposed on the first alignment layer AL1. Due to the spacer CS, a space is secured between the display substrate 100 and the opposite substrate 200 such that the liquid crystal layer 300 is interposed between the display substrate 100 and the opposite substrate 200.

Referring to FIG. 12, the opposite substrate 200 includes a second base substrate 210, a black matrix 220, an overcoat layer 230, a common electrode 240 and a second alignment layer AL2. In an exemplary embodiment, the second base substrate 210 may include an insulating substrate having a light transmitting property and a flexible property.

The common electrode 240 generates the electric field in cooperation with the pixel electrode PE to control the liquid crystal layer 300. The liquid crystal molecules of the liquid crystal layer 300 are aligned according to the electric field generated between the pixel electrode PE and the common electrode 240. The common electrode 240 receives a common voltage, and the first and second sub-pixel electrodes PE1 and PE2 receive the first data voltage and the second data voltage from the first and second data lines DL1 and DL2, respectively. Thus, the electric field is generated to have intensity corresponding to a difference in electric potential between the common voltage and the first data voltage or between the common voltage and second data voltage, and the liquid crystal molecules of the liquid crystal layer 300 are realigned according to the intensity of the electric field, thereby control a transmittance of the light passing therethrough.

The light provided to the liquid crystal layer 300 may be provided from the backlight assembly (not shown) disposed at a rear side of the display substrate 100.

Figure 13:
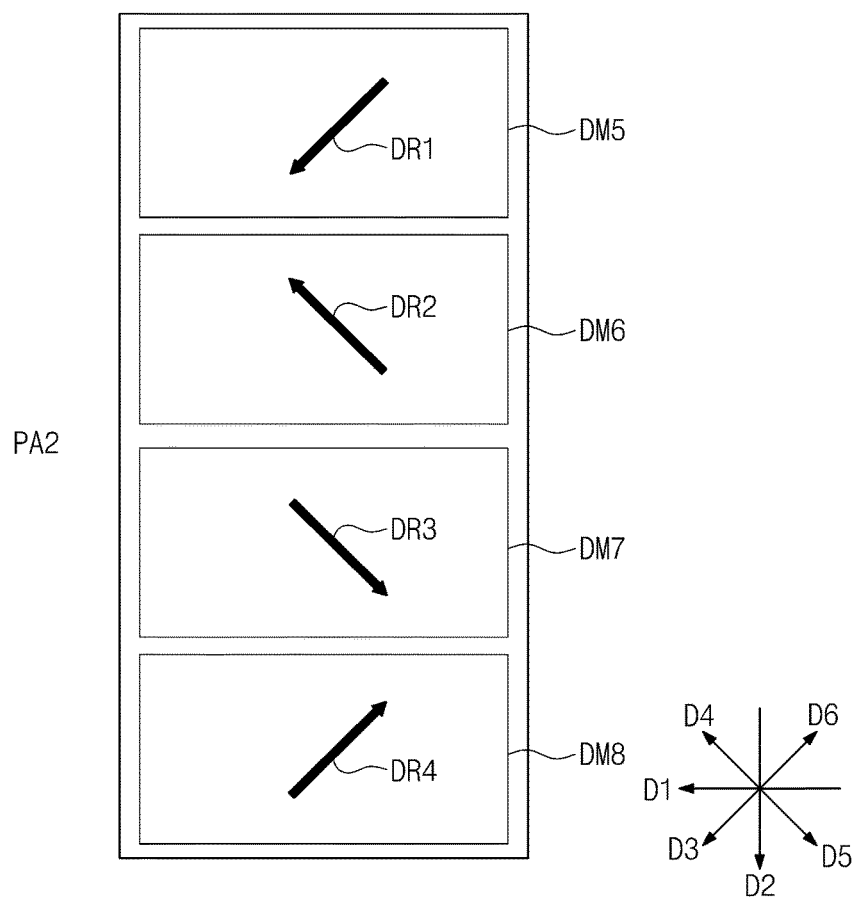
FIG. 13 is a diagram showing domains and liquid crystal alignment directions, which are defined in a pixel area.

FIG. 13 is a diagram showing domains and liquid crystal alignment directions defined in the pixel area.

Referring to FIGS. 11 and 13, the first sub-pixel electrode PE1 includes a first horizontal trunk portion HS1, a second horizontal trunk portion HS2, a first vertical trunk portion VS1, a second vertical trunk portion VS2, and first, second, third, and fourth branch portions B1, B2, B3, and B4.

Each of the first and second vertical trunk portions VS1 and VS2 extends in the second direction D2, and the second direction D2 crosses the first direction D1 in which the curved display device 500 is curved, i.e., the second direction D2 may be substantially perpendicular to the first direction D1 when viewed in a plan view.

The first horizontal trunk portion HS1 extends in the first direction D1 and is branched from a center portion of the first vertical trunk portion VS1. Thus, the first vertical trunk portion VS1 and the first horizontal trunk portion HS1 are coupled to each other to provide a T-shape that is rotated by 90 degrees in a counter-clockwise in a plan view.

Portions of the first branch portions B1 are branched from the first horizontal trunk portion HS1, and the other portions of the first branch portions B1 are branched from the first vertical trunk portion VS1. In addition, each of the first branch portions B1 extends in a third direction D3 inclined with respect to the first direction D1 and the second direction D2 when viewed in a plan view, and the first branch portions B1 are spaced apart from each other.

Portions of the second branch portions B2 are branched from the first horizontal trunk portion HS1, and the other portions of the second branch portions B2 are branched from the first vertical trunk portion VS1. In addition, each of the second branch portions B2 extends in a fourth direction D4 inclined with respect to the first and second directions D1 and D2 when viewed in a plan view, and the second branch portions B2 are spaced apart from each other.

When viewed in a plan view, the fourth direction D4 may cross the third direction D3. In an exemplary embodiment, the third direction D3 may be substantially perpendicular to the fourth direction D4, and each of the third and fourth directions D3 and D4 may define an angle of about 45 degree with respect to the first direction D1 or the second direction D2.

The first branch portions B1 are symmetrical with the second branch portions B2 with respect to the first horizontal trunk portion HS1, and the first horizontal trunk portion HS1 are disposed between a first domain DM1 and a second domain DM2.

The second horizontal trunk portion HS2 extends in the first direction D1 and is branched from a center portion of the second vertical trunk portion VS2. Thus, the second vertical trunk portion VS2 and the second horizontal trunk portion HS2 are coupled to each other to provide a T shape rotated by 90 degrees in a clockwise in a plan view.

Portions of the third branch portions B3 are branched from the second horizontal trunk portion HS2, and the other portions of the third branch portions B3 are branched from the second vertical trunk portion VS2. In addition, each of the third branch portions B3 extends in a fifth direction D5 inclined with respect to the first direction D1 and the second direction D2 when viewed in a plan view, and the third branch portions B3 are spaced apart from each other.

Portions of the fourth branch portions B4 are branched from the second horizontal trunk portion HS2, and the other portions of the fourth branch portions B4 are branched from the second vertical trunk portion VS2. In addition, each of the fourth branch portions B4 extends in a sixth direction D6 inclined with respect to the first direction D1 and the second direction D2 when viewed in a plan view, and the fourth branch portions B4 are spaced apart from each other.

When viewed in a plan view, the sixth direction D6 may cross the fifth direction D5. In an exemplary embodiment, the fifth direction D5 may be substantially perpendicular to the sixth direction D6, and each of the fifth and sixth directions D5 and D6 may define an angle of about 45 degree with respect to the first direction D1 or the second direction D2, for example.

The third branch portions B3 are symmetrical with the fourth branch portions B4 with respect to the second horizontal trunk portion HS2, and the second horizontal trunk portion HS2 are disposed between a third domain DM3 and a fourth domain DM4.

In an exemplary embodiment, the second sub-pixel electrode PE2 may have a size different from that of the first sub-pixel electrode PE1, but the second sub-pixel electrode PE2 may have a shape similar to that of the first sub-pixel electrode PE1.

The second sub-pixel electrode PE2 includes a third horizontal trunk portion HS3, a fourth horizontal trunk portion HS4, a third vertical trunk portion VS3, a fourth vertical trunk portion VS4, and fifth to eighth branch portions B5, B6, B7, and B8.

The third and fourth horizontal trunk portions HS3 and HS4 extend in the first direction D1, and the third vertical trunk portion VS3 and the fourth vertical trunk portion VS4 extend in the second direction D2. The third horizontal trunk portions HS3 is branched from a center portion of the third vertical trunk portion VS3, and the fourth horizontal trunk portion HS4 is branched from the fourth vertical trunk portion VS4. In the exemplary embodiment, the third horizontal trunk portion HS3 is branched from a center portion of the third vertical trunk portion VS3, and the fourth horizontal trunk portion HS4 is branched from a center portion of the fourth vertical trunk portion VS4.

Each of the fifth branch portions B5 extends in the third direction D3 when viewed in a plan view, and the fifth branch portions B5 are spaced apart from each other. In addition, portions of the fifth branch portions B5 are branched from the third horizontal trunk portion HS3, and the other portions of the fifth branch portions B5 are branched from the third vertical trunk portion VS3.

Each of the sixth branch portions B6 extends in the fourth direction D4 when viewed in a plan view, and the sixth branch portions B6 are spaced apart from each other. In addition, portions of the sixth branch portions B6 are branched from the third horizontal trunk portion HS3, and the other portions of the sixth branch portions B6 are branched from the third vertical trunk portion VS3.

Each of the seventh branch portions B7 extends in the fifth direction D5 when viewed in a plan view, and the seventh branch portions B7 are spaced apart from each other. In addition, portions of the seventh branch portions B7 are branched from the fourth horizontal trunk portion HS4, and the other portions of the seventh branch portions B7 are branched from the fourth vertical trunk portion VS4.

Each of the eighth branch portions B8 extends in the sixth direction D6 when viewed in a plan view, and the eighth branch portions B8 are spaced apart from each other. In addition, portions of the eighth branch portions B8 are branched from the fourth horizontal trunk portion HS4, and the other portions of the eighth branch portions B8 are branched from the fourth vertical trunk portion VS4.

As shown in FIG. 13, the first to fourth domains DM1 to DM4 are defined in the first sub-pixel area PA1, and fifth to eighth domains DM5 to DM8 are defined in the second sub-pixel area PA2.

Also, in the case that the first to fourth domains DM1 to DM4 are defined in the first sub-pixel area PA1, and the fifth to eighth domains DM5 to DM8 are defined in the second sub-pixel area PA2, the first sub-pixel electrode PE1 further includes a first domain connection part LP1 and the second sub-pixel electrode PE2 further includes a second domain connection part LP2.

The first domain connection part LP1 is disposed between the second domain DM2 and the third domain DM3 to connect the second branch portions B2 and the third branch portions B3, and the second domain connection part LP2 is disposed between the sixth domain DM6 and the seventh domain DM7 to connect the sixth branch portions B6 and the seventh branch portions B7. The first domain connection part LP1 may be disposed at a center of a border area between the second domain DM2 and the third domain DM3, and the second domain connection part LP2 may be disposed at a center of a border area between the sixth domain DM6 and the seventh domain DM7.

When an area in which the liquid crystal molecules are aligned by the first branch portions B1 is referred to as the first domain DM1, a first liquid crystal alignment direction DR1 in the first domain DM1 corresponds the third direction D3. When an area in which the liquid crystal molecules are aligned by the second branch portions B2 is referred to as the second domain DM2, a second liquid crystal alignment direction DR2 in the second domain DM2 corresponds to the fourth direction D4.

A third liquid crystal alignment direction DR3 in the third domain DM3 corresponds to the fifth direction D5, and a fourth liquid crystal alignment direction DR4 in the fourth domain DM4 corresponds to the sixth direction D6.

According to the above, the first to fourth domains DM1 to DM4, which are sequentially arranged in the second direction D2, are provided in the first sub-pixel area PA1, and the liquid crystal alignment directions in the first to fourth domains DM1 to DM4 are different from each other. Thus, a viewing angle of the first sub-pixel area PA1 may be widened.

In addition, the fifth to eighth domains DM5 to DM8, which are sequentially arranged in the second direction D2, are provided in the second sub-pixel area PA2, and the liquid crystal alignment directions in the fifth to eighth domains DM5 to DM8 are different from each other. Thus, a viewing angle of the second sub-pixel area PA2 may be widened.

The first to eighth domains DM1 to DM8 are arranged in the second direction D2 in one pixel. Therefore, the domains having different liquid crystal alignment directions are prevented from being overlapped with each other due to a misalignment occurring in the curved display device 500 curved in the first direction D1, thereby preventing a texture defect caused by the misalignment of the liquid crystal molecules.

Figure 14:
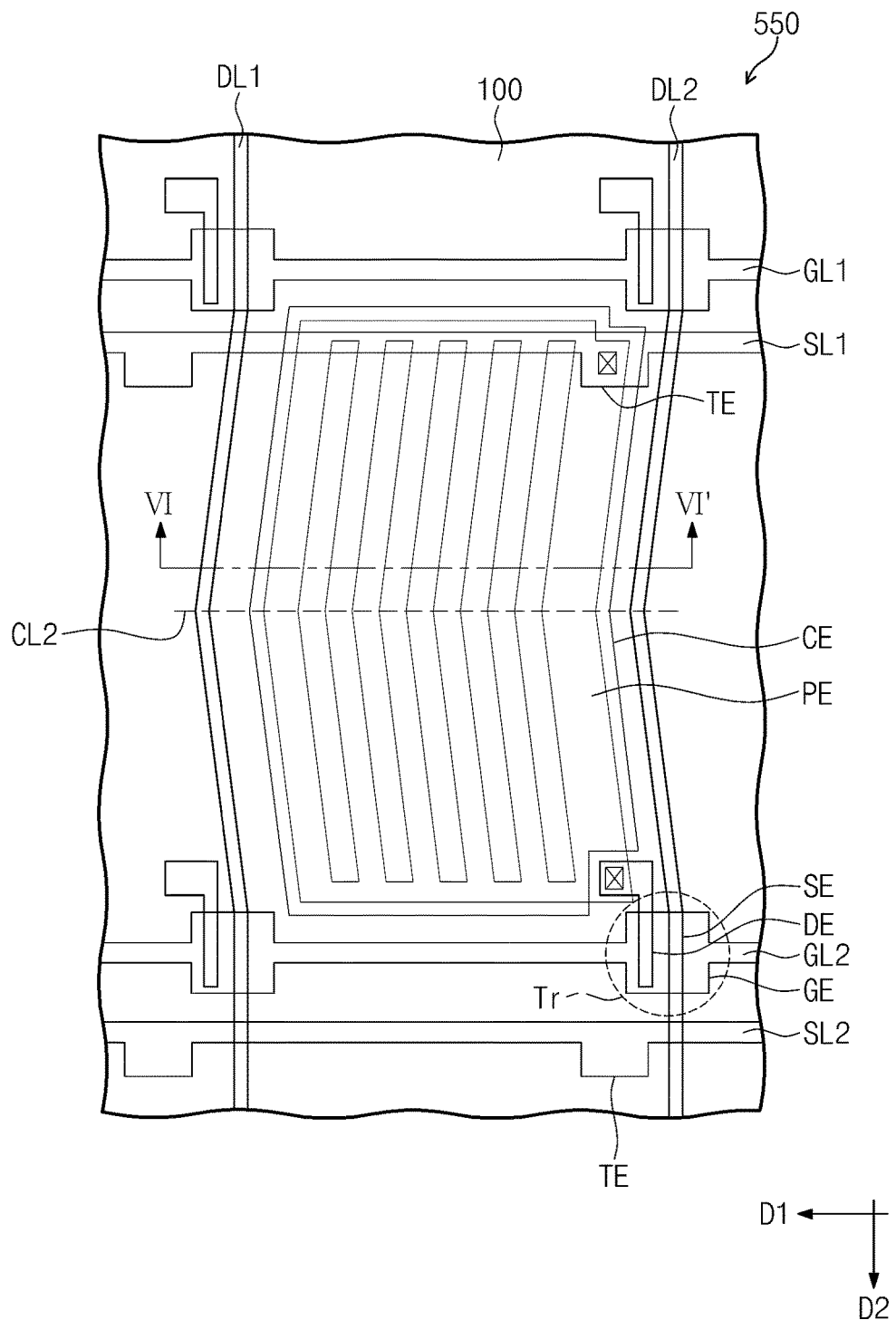
FIG. 14 is a plan view showing another exemplary embodiment of a pixel of a curved display device according to the invention.
Figure 15:
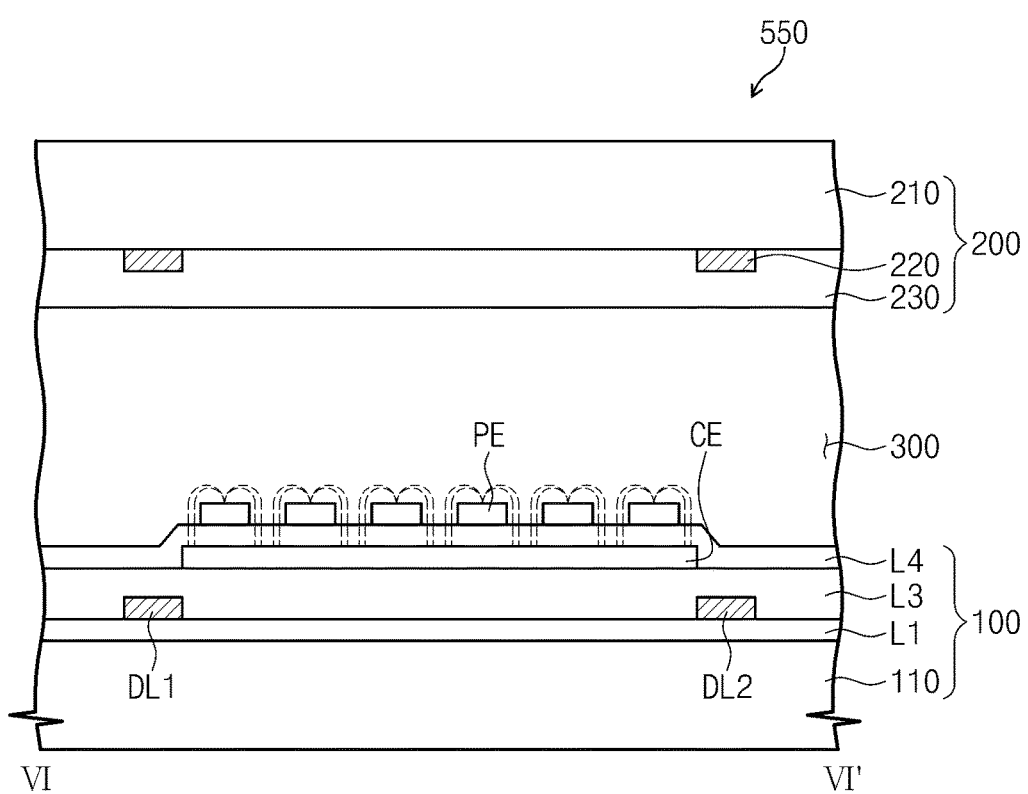
FIG. 15 is a cross-sectional view taken along line VI-VI' of FIG. 14.

FIG. 14 is a plan view showing a pixel of a curved display device according to another exemplary embodiment of the invention, and FIG. 15 is a cross-sectional view taken along a line VI-VI' of FIG. 14.

Referring to FIGS. 14 and 15, a curved display device 550 includes a display substrate 100, an opposite substrate 200 facing the display substrate 100, and a liquid crystal layer 300 interposed between the display substrate 100 and the opposite substrate 200.

The display substrate 100 includes a first base substrate 110 including transparent glass or plastic and a first gate line GL1, a second gate line GL2, a first data line DL1, and a second data line DL2, which are disposed on the first base substrate 110.

The first and second gate lines GL1 and GL2 extend in a first direction D1 and arranged in a second direction D2 substantially perpendicular to the first direction D1 while being spaced apart from each other. The first and second data line DL1 and DL2 extend in the second direction D2 and spaced apart from each other in the first direction D1 with a predetermined distance.

The first and second gate lines GL1 and GL2 are electrically insulated from the first and second data lines DL1 and DL2 by a gate insulating layer L1. In addition, the first and second data lines DL1 and DL2 are covered by a third insulating layer L3.

As shown in FIG. 14, each of the first and second data lines DL1 and DL2 has a bent shape that is symmetrical with respect to a center line CL2 crossing a center portion between the first gate line GL1 and the second gate line GL2. A direction to which the first and second data lines DL1 and DL2 are bent may be changed to an opposite direction in the unit of one row.

The display substrate 100 further includes a first storage line SL1 disposed in parallel to the first gate line GL1 and a second storage line SL2 disposed in parallel to the second gate line GL2 on the first base substrate 110.

The display substrate 100 further includes a TFT Tr, a pixel electrode PE, and a common electrode CE, which are disposed thereon. Particularly, the TFT Tr includes a gate electrode GE branched from the second gate line GL2, a source electrode SE including a part of the second data line DL2, and a drain electrode DE disposed on the gate electrode GE while being spaced apart from the source electrode SE with a predetermined distance. The drain electrode DE is electrically connected to the pixel electrode PE.

As an exemplary embodiment, the pixel electrode PE includes a plurality of branch portions, the branch portions extend in the second direction D2 between the first and second data lines DL1 and DL2, and the branch portions are arranged in the first direction D1. In addition, each of the branch portions has a bent shape that is symmetrical with respect to the center line CL2.

The common electrode CE is disposed on an upper portion or a lower portion of the pixel electrode PE, and the common electrode CE may have a size corresponding to that of a pixel area defined by the first and second gate lines GL1 and GL2 and the first and second data lines DL1 and DL2. However, the invention is not limited thereto, and the pixel area may not be defined by the first and second gate lines GL1 and GL2 and the first and second data lines DL1 and DL2. As shown in FIG. 15, the common electrode CE is disposed under the pixel electrode PE. However, the position of the common electrode CE should not be limited thereto or thereby. That is, in another exemplary embodiment, the common electrode CE may be disposed on the upper portion of the pixel electrode PE. In addition, the common electrode CE faces the pixel electrode PE and a fourth insulating layer L4 is interposed between the common electrode CE and the pixel electrode PE.

As an exemplary embodiment, a storage electrode TE extending from the first storage line SL1 is electrically connected to the common electrode CE. Thus, the common electrode CE may receive a storage voltage applied to the first storage line SL1 as a reference voltage.

The opposite substrate 200 includes a second base substrate 210 including transparent glass or plastic, a black matrix 220, and an overcoat layer 230, which are disposed on the second base substrate 210.

When a gate signal is applied to the second gate line GL2, the TFT Tr is turned on in response to the gate signal. A data voltage applied to the second data line DL2 is output through the drain electrode DE of the turned-on TFT Tr and applied to the pixel electrode PE.

The pixel electrode PE applied with the data voltage generates an electric field in cooperation with the common electrode CE applied with the reference voltage, and thus an alignment direction of the liquid crystal molecules in the liquid crystal layer 300 disposed on the pixel electrode PE and the common electrode CE is determined. Then, a polarization of light passing through the liquid crystal layer 300 is changed according to the alignment direction of the liquid crystal molecules.

The pixel electrode PE and the common electrode CE provide a liquid crystal capacitor using the liquid crystal layer 300 as a dielectric substance of the liquid crystal capacitor to maintain a voltage applied thereto after the TFT Tr is turned off. In addition, the first storage line SL1 is disposed to overlap with the pixel electrode PE and the common electrode CE. Thus, the first storage line SL1 provides a storage capacitor together with the pixel electrode PE and the common electrode CE using the gate insulating layer L1 and the third and fourth insulating layers L3 and L4 as the dielectric substance of the storage capacitor to improve voltage maintenance ability of the liquid crystal capacitor.

Figure 16:
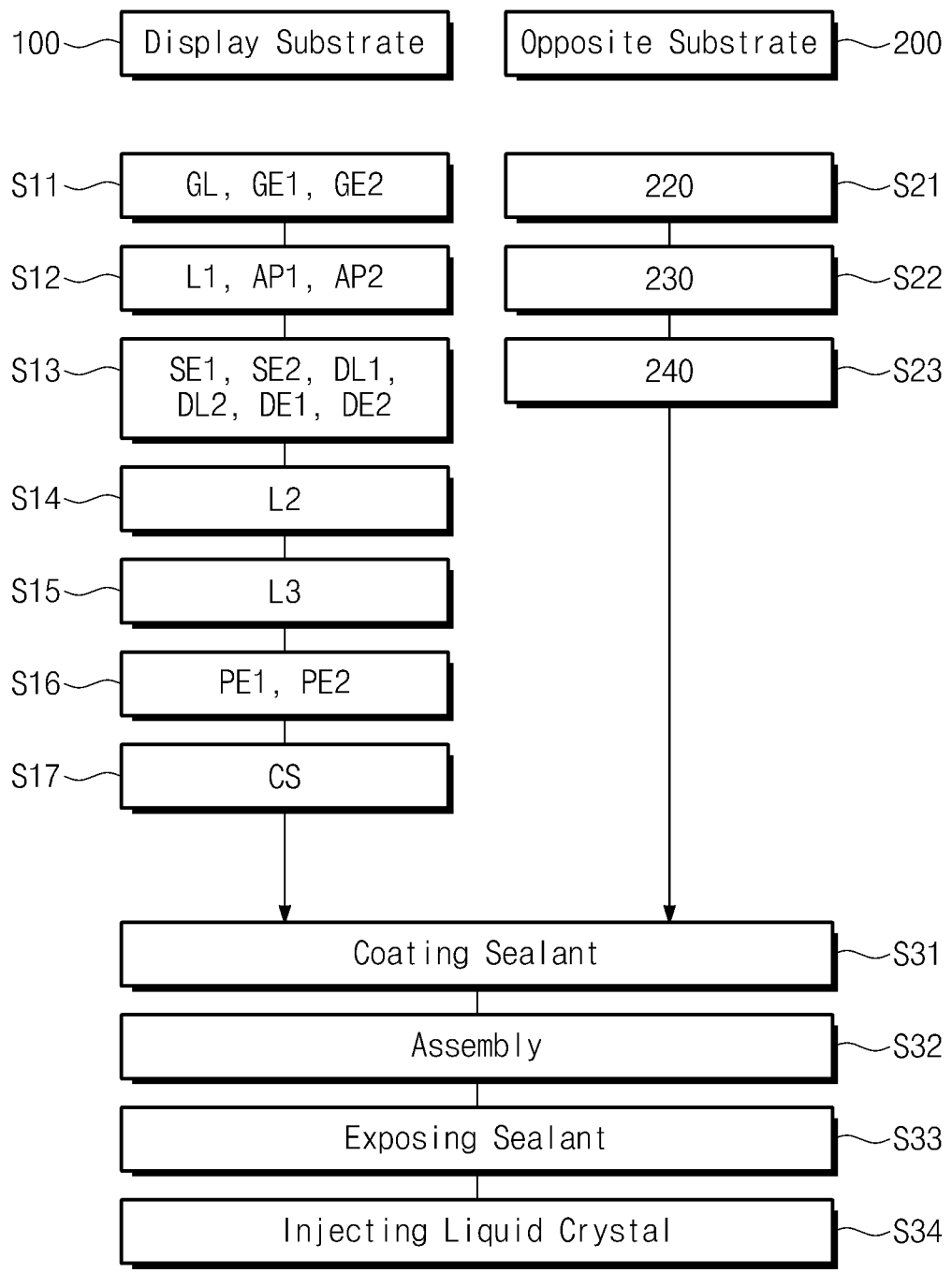
FIG. 16 is a flowchart showing an exemplary embodiment of a manufacturing process of a curved display device according to the invention.

FIG. 16 is a flow chart showing a manufacturing process of a curved display device according to an exemplary embodiment of the invention.

Referring to FIG. 16, a manufacturing process of the display substrate 100 includes first to seventh operations S11 to S17, and a manufacturing process of the opposite substrate 200 includes first to third operations S21 to S23.

In detail, in order to manufacture the display substrate 100, the gate line GL, the first gate electrode GE1, and the second gate electrode GE2 are disposed on the first base substrate 110 (S11).

Then, the first insulating layer L1 is disposed on the first base substrate 110 to cover the gate line GL and the first and second gate electrodes GE1 and GE2, and the first and second active patterns AP1 and AP2 are disposed on the first insulating layer L1 (S12). The first and second active patterns AP1 and AP2 may be disposed to face the first and second gate electrodes GE1 and GE2, respectively.

The first and second data lines DL1 and DL2 are disposed on the first insulating layer L1, the first source electrode SE1 and the first drain electrode DE1 are disposed on the first active pattern AP1, and the second source electrode SE2 and the second drain electrode DE2 are disposed on the second active pattern AP2 (S13). Thus, the first and second TFTs TR1 and TR2 are disposed on the display substrate 100.

The second insulating layer L2 is disposed on the display substrate 100 to cover the first and second TFTs TR1 and TR2 (S14). The third insulating layer L3 is disposed on the second insulating layer L2 (S15). In an exemplary embodiment, the third insulating layer L3 may include the red color pixel R, the green color pixel G, and the blue color pixel B, for example.

The pixel electrode PE is disposed on the third insulating layer L3 (S16). The pixel electrode PE includes the first and second sub-pixel electrodes PE1 and PE2. The spacer CS is disposed on the pixel electrode PE (S17).

Although not shown in figures, the first alignment layer AL1 (refer to FIG. 12) may be provided between the providing the pixel electrode PE (S16) and the providing the spacer CS (S17).

Next, in order to manufacture the opposite substrate 200, the black matrix 220 is disposed on the second base substrate 210 (S21). In the case that the coupling member 350 (refer to FIG. 1) includes the light blocking material, the black matrix 220 may be provided only in the display area DA (refer to FIG. 1).

The overcoat layer 230 is provided to compensate for the step difference between the black matrix 220 and the second base substrate 210 (S22). The common electrode 240 is disposed on the overcoat layer 230 (S23). Although not shown in the flow chart, the second alignment layer AL2 (refer to FIG. 12) may be disposed on the common electrode 240.

When each of the display substrate 100 and the opposite substrate 200 is manufactured, a sealant having a black color is coated on one of the display substrate 100 and the opposite substrate 200 (S31). The sealant is used to provide the coupling member 350. As described above, an amount of the sealant, to be coated, may be determined according to a predetermined width of the coupling member 350.

After the sealant is coated, the display substrate 100 is assembled with the opposite substrate 200 (S32).

The sealant may include a UV curing agent. Thus, the sealant is cured by the UV light irradiated thereto (S33). Here, the UV light may be provided from the display substrate 100 or the opposite substrate 200. Especially, when the sealant includes the light blocking material, the sealant may be cured by the UV light irradiated from the opposite substrate 200 since the black matrix may be omitted in the peripheral area PA (refer to FIG. 1). Thus, the coupling member 350 used to couple the display substrate 100 to the opposite substrate 200 is provided.

Then, the liquid crystal layer 300 is provided between the display substrate 100 and the opposite substrate 200 (S34). As a result, the curved display device 500 is completed.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A curved display device comprising:
  a display substrate which is curved in a first direction in a plan view and comprises:
    a display area comprising a plurality of pixels configured to display an image; and
    a peripheral area disposed adjacent to the display area;
  an opposite substrate which faces the display substrate, the opposite substrate coupled to the display substrate and curved in the first direction along the display substrate;
  a grayscale control layer interposed between the display substrate and the opposite substrate;
  a coupling member which is disposed in the peripheral area, interposed between the display substrate and the opposite substrate, and configured to couple the display substrate to the opposite substrate, and comprises a first sealing portion which extends in the first direction and comprises a light blocking material and a second sealing portion which extends in a second direction substantially perpendicular to the first direction, and a peripheral black matrix which is disposed to cover the second sealing portion,
wherein the peripheral black matrix is not overlapped with the first sealing portion in the plan view.

2. The curved display device of claim 1, wherein the second sealing portion comprises a transparent material.

3. The curved display device of claim 1, wherein a width of the first sealing portion in the second direction is greater than a width of the second sealing portion in the first direction.

4. The curved display device of claim 1, wherein the peripheral black matrix is disposed on the opposite substrate.

5. The curved display device of claim 1, wherein the second sealing portion comprises the light blocking material.

6. The curved display device of claim 1, wherein
the peripheral area surrounds the display area, and
the coupling member has a closed-loop shape along the peripheral area in the plan view.

7. The curved display device of claim 1, wherein a width of the first sealing portion in a second direction, which is substantially perpendicular to the first direction, increases as a distance from a center line, which crosses a center portion of the display area and is substantially parallel to the second direction, decreases.

8. The curved display device of claim 1, wherein the coupling member is configured to allow a stress applied to the first sealing portion to be equal to or smaller than about 10.4 megapascals when a curvature radius in the first direction is in a range of about 3200 millimeters to about 5400 millimeters.

9. The curved display device of claim 1, wherein
the grayscale control layer comprises a liquid crystal layer,
the display area further comprises a plurality of pixel areas in which the plurality of pixels is disposed,
a plurality of domains is defined in each of the plurality of pixel areas,
alignment directions of liquid crystal molecules of the liquid crystal layer in at least two domains among the plurality of domains are different from each other, and
the plurality of domains is arranged in the second direction.

10. The curved display device of claim 9, wherein the alignment directions in which the liquid crystal molecules are inclined in response to an electric field are different from each other in the plurality of domains in the plan view.

11. The curved display device of claim 9, wherein
the display substrate further comprises a pixel electrode disposed in each of the plurality of pixel areas, and
the opposite substrate comprises a common electrode which generates an electric field in cooperation with the pixel electrode.

12. The curved display device of claim 11, wherein the pixel electrode comprises:
a first sub-pixel electrode disposed in a first sub-pixel area of each of the plurality of pixel areas; and
a second sub-pixel electrode disposed in a second sub-pixel area of each of the plurality of pixel areas.

13. The curved display device of claim 12, wherein the display substrate further comprises:
a first data line which is electrically connected to the first sub-pixel electrode and applies a first data signal to the first sub-pixel electrode; and
a second data line which is electrically connected to the second sub-pixel electrode and applies a second data signal, which is different from the first data signal, to the second sub-pixel electrode.

14. The curved display device of claim 1, wherein the display substrate further comprises a driving circuit disposed in the peripheral area overlapped with the coupling member.

* * * * *